(12) United States Patent
Appelquist et al.

(10) Patent No.: US 11,320,402 B2
(45) Date of Patent: May 3, 2022

(54) METHOD FOR ULTRASONIC INSPECTION OF A TEST OBJECT

(71) Applicant: CAR-O-LINER GROUP AB, Västra Frölunda (SE)

(72) Inventors: Mats Appelquist, Torslanda (SE); Henrik Ottosson, Sävedalen (SE); Lars-Erik Philipsson, Örebro (SE)

(73) Assignee: CAR-O-LINER GROUP AB, Västra Frölunda (SE)

( * ) Notice: Subject to any disclaimer, the term of this patent is extended or adjusted under 35 U.S.C. 154(b) by 154 days.

(21) Appl. No.: 16/346,580

(22) PCT Filed: Nov. 1, 2017

(86) PCT No.: PCT/EP2017/077962
§ 371 (c)(1),
(2) Date: May 1, 2019

(87) PCT Pub. No.: WO2018/083119
PCT Pub. Date: May 11, 2018

(65) Prior Publication Data
US 2019/0257792 A1 Aug. 22, 2019

(30) Foreign Application Priority Data
Nov. 7, 2016 (EP) .................................... 16197539

(51) Int. Cl.
*G01N 29/04* (2006.01)
*G01M 17/007* (2006.01)
(Continued)

(52) U.S. Cl.
CPC ........ *G01N 29/041* (2013.01); *G01M 17/007* (2013.01); *G01N 29/043* (2013.01);
(Continued)

(58) Field of Classification Search
CPC .. G01N 29/041; G01N 29/4409; G01N 29/30; G01N 29/4454; G01N 29/223;
(Continued)

(56) References Cited

U.S. PATENT DOCUMENTS 7,426,447 B2 * 9/2008 Pado ...................... G01N 29/12
342/352
7,654,142 B2 2/2010 Dominguez et al.
(Continued)

FOREIGN PATENT DOCUMENTS

WO 2015152795 A1 10/2015

OTHER PUBLICATIONS

PCT International Search Report and Written Opinion dated Jan. 5, 2018 for International Application No. PCT/EP2017/077962, 11 pages.
(Continued)

*Primary Examiner* — Tarun Sinha
(74) *Attorney, Agent, or Firm* — RMCK Law Group, PLC

(57) ABSTRACT

The present invention relates to method for ultrasonic inspection of a test object, comprising the steps of defining a coordinate system of the test object; selecting, relative to the coordinate system of the test object, at least two positions of a test area; positioning a respective ultrasonic measuring device at the at least two positions within the test area; transmitting, an ultrasonic wave pattern into the test object; receiving an ultrasonic wave pattern signal; acquiring an ultrasonic reference wave pattern signal for a reference area of a reference object, and comparing the received ultrasonic wave pattern signal from the test object with the acquired ultrasonic reference wave pattern signal of the reference object for detecting a defect in the test object.

11 Claims, 4 Drawing Sheets

(51) Int. Cl.
*G01N 29/22* (2006.01)
*G01N 29/44* (2006.01)
*G01N 29/30* (2006.01)

(52) U.S. Cl.
CPC ........... *G01N 29/223* (2013.01); *G01N 29/30* (2013.01); *G01N 29/4409* (2013.01); *G01N 29/4427* (2013.01); *G01N 29/4436* (2013.01); *G01N 29/4454* (2013.01); *G01N 2291/0231* (2013.01); *G01N 2291/0234* (2013.01); *G01N 2291/044* (2013.01); *G01N 2291/048* (2013.01); *G01N 2291/2638* (2013.01)

(58) Field of Classification Search
CPC .......... G01N 29/4427; G01N 29/4436; G01N 2291/0231; G01N 2291/044; G01N 2291/0234; G01N 2291/048; G01N 2291/2638; G01M 17/007
USPC .......................................................... 73/628
See application file for complete search history.

(56) References Cited

U.S. PATENT DOCUMENTS

| | | | |
|---|---|---|---|
| 8,042,397 B2* | 10/2011 | Ihn | G01N 29/07 73/603 |
| 8,290,720 B2 | 10/2012 | Kitazawa et al. | |
| 9,250,214 B2* | 2/2016 | Ferrari | G01B 21/04 |
| 2009/0303064 A1* | 12/2009 | LaBreck | G01N 29/30 340/678 |
| 2016/0018324 A1* | 1/2016 | Georgeson | G01N 29/043 250/341.6 |

OTHER PUBLICATIONS

EPO Communication Pursuant to Article 94(3) EPC dated Dec. 11, 2020 for EP Application No. 17791703.6, 6 pages.

* cited by examiner

METHOD FOR ULTRASONIC INSPECTION OF A TEST OBJECT

CROSS-REFERENCE TO RELATED APPLICATIONS

This application is a 371 U.S. National Stage of International Application No. PCT/EP2017/077962, filed Nov. 1, 2017, which claims priority to European Patent Application No. 16197539.6, filed Nov. 7, 2016. The disclosures of each of the above applications are incorporated herein by reference in their entirety.

TECHNICAL FIELD

The present invention relates to a method for ultrasonic inspection of a test object and in particular to a method in which the measurement of the test object is compared to a measurement made on a reference object.

BACKGROUND

Detection of flaws or defects in structures is a continuous demand in several fields of industry. Especially, within the field of automotive, there is an increasing demand of being able to determine if a vehicle component has been damaged or, for example, a glue joint is sufficiently attaching components to each other, etc. In order to inspect the various components of the vehicle, there is a desire in doing so without the need of disassembling or destruct the specific component, since such operation is most often associated with e.g. a relatively high cost. The inspection of interest is thus a so-called non-destructive inspection.

There are different methods available for executing these types of non-destructive inspection. One example is the use of ultrasonic measurements of test pieces for detecting flaws/defects in a structure. Hereby, an ultrasonic wave is transmitted into the test piece, which ultrasonic wave is received by a receiver and thereafter evaluated to determine flaws/defects in the material. The ultrasonic measurement method is well known when being used in fluid applications. However, since solid materials are e.g. not completely homogenous, there is a struggle to provide ultrasonic inspection methods that provides test results with sufficient reliability.

Thus, although the prior art has started to initiate non-destructive ultrasonic measurements for detecting flaws/defects in solid materials, there is still a need to further develop such methods for achieving more confident results, which methods also being applicable to a wider variety of structures.

SUMMARY

It is therefore an object of the present invention to provide a method for ultrasonic inspection of a test object which at least partially overcomes the deficiencies of the prior art. This is achieved by a method according to claim 1.

According to a first aspect of the present invention, there is provided a method for ultrasonic inspection of a test object, comprising the steps of defining a coordinate system of the test object based on at least a first, a second and a third spatially separated position at a surface of the test object; selecting, relative to the coordinate system of the test object, at least two spaced apart positions of a test area of the test object, the test area being an area of the test object which is to be inspected; positioning a first and a second transducer of an ultrasonic measuring device at a respective one of the at least two positions within the test area, wherein each of the transducers comprises a transmitter for transmitting an ultrasonic wave pattern signal and a receiver for receiving an ultrasonic wave pattern signal; transmitting, by means of the transmitter of the first transducer, an ultrasonic wave pattern into the test object along the surface of the test area; receiving, by means of the receiver of the second transducer, the ultrasonic wave pattern signal transmitted by the transmitter of the first transducer; acquiring an ultrasonic reference wave pattern signal for a reference area of a reference object, the reference area being provided with a first and a second transducer of an ultrasonic measuring device having a respective position within a coordinate system of the reference object corresponding to the at least two positions of the test area within the coordinate system of the test object; and comparing the received ultrasonic wave pattern signal from the test object with the acquired ultrasonic reference wave pattern signal of the reference object for detecting a defect in the test object.

The wording "selecting at least two positions of the test area" should not be construed as only relate to a free choice of selecting. As will be described further below, the at least two positions may be predetermined positions which are determined based on corresponding positions of the reference object. In such case, the step of selecting is made based on predetermined positions already known and which corresponds to the positions used when executing the ultrasonic reference measurement. Hence, when selecting the positions of the test area, this may be made freely, or within a specific area, or based on a specific position within the test area. Further, the wording "spaced apart" should be construed such that the transducers are spaced apart from each other. Thus, the at least two transducers are preferably arranged at two different positions along the surface of the test object for being able to transmit an ultrasonic wave pattern along the surface between the two transducers. Accordingly, the ultrasonic wave pattern signal is transmitted in a direction (or directions) parallel to the surface of the test object, i.e. in directions perpendicular to the surface normal of the test object.

Furthermore, the wording "defect in the test object" should be construed to also relate to various sizes of the defect. Such defect may also be referred to as a flaw which might be difficult to visually detect. Also, the defect may relate to a defect in a glue joint connecting e.g. two solid pieces together. The defect in such glue joint may be caused by the glue loosing its attachment to one of the solid pieces.

An advantage of the present invention is that relatively complex geometric structures can be inspected by means of the ultrasonic measurements. Also, the ultrasonic measurement of the test object can be easily performed at a garage or work shop, wherein e.g. the mechanic at the garage performs the ultrasonic measurement to the test object, where after he/she acquires ultrasonic reference wave pattern signal(s) made in advance on a reference object which, as will be described below, corresponds to the test object. The reference object is thus known to be free from defects and flaws, i.e. flawless. The mechanic at the garage does therefore not need to make any comparison by having to execute a reference measurement by himself.

An advantage of using at least two transducers is that the defects/flaws can be detected between the transmitter of the first transducer and the receiver of the second transducer. Hence, ultrasonic measurements can be made in a geometric plane which is perpendicular to the depth of the material between the at least two transducers.

The inventors of the present disclosure have realized that when performing an ultrasonic measurement for a relatively complex geometric structure, or a structure having a relatively complex material composition, it is vital that the ultrasonic measuring device/devices is/are placed at similar coordinates as was made for the reference measurement in order to be able to make a proper and accurate comparison of the ultrasonic wave pattern signals. Preferably, the ultrasonic measuring device is positioned at a similar angular position on the test object as was made for a corresponding ultrasonic measuring device on the reference object. The complex geometric structure may e.g. relate to a vehicle component which is bent in all three dimensions, while a complex material composition may relate laminated structures, glued structures, carbon fiber structures, etc. A further advantage is therefore that the method can be executed by placing the test object at almost any desirable position in space when executing the ultrasonic measurement thereon. The defined coordinate system of the test object can thereafter be transformed into the coordinate system for the reference object such that the ultrasonic measuring devices are positioned relative to the coordinate system of the test object in a similar manner as the ultrasonic measuring devices were positioned relative to the coordinate system of the reference object. The mechanic is in no need to position the test object at the exact same position in space as the position the reference object had when performing the ultrasonic measurement on the reference object, although such placement of the test object also forms part of the scope of protection and which will be described further below. The method can thus be performed without expert skills.

According to an example embodiment, the test area of the test object and the reference area of the reference object may correspond to each other in shape and structure.

Hereby, the ultrasonic measurements are made on a test object and a reference object stemming from the same structure. Hence, the test object is a similar structure as the reference object.

According to an example embodiment, the selected position of the test area may be a predetermined position.

According to an example embodiment, the ultrasonic reference wave pattern signal may be provided from an ultrasonic reference measurement on a position of the reference area, wherein the step of selecting a position of the test area comprises the step of selecting, relative to the coordinate system of the test object, a position of the test area corresponding to the position of the ultrasonic reference measurement.

The predetermined position may thus preferably, as described above, correspond to the position used when performing the ultrasonic reference measurement. This may be the exact same position/positions, or positions of the test object which are arranged within a predetermined distance from the corresponding positions used when performing the ultrasonic reference measurement. As also described, the predetermined position may further also relate to a predetermined angular position of the ultrasonic measuring device. Hereby, the transmitter of the ultrasonic measuring device has an angular position relative to the surface normal of the test object which corresponds to the angular position the measuring device had relative to the surface normal of the reference object. An advantage is that it will be easier to compare the ultrasonic wave pattern signals from the reference measurement with the ultrasonic wave pattern signals form the test measurement as they are performed in a similar/same manner.

According to an example embodiment, the predetermined position may comprise a predetermined angular position of the at least one ultrasonic measuring device relative to a normal of a surface of said position within the test area, said predetermined angular position corresponding to an angular position of the ultrasonic measuring device of the reference area.

According to an example embodiment, the reference object may form part of a global structure having a global coordinate system, wherein the method may comprise the steps of acquiring coordinates for at least a first, a second and a third spatially separated position at a surface of the reference object relative to the global coordinate system; and transforming the test object into the coordinate system of the reference object for positioning the test object at a position in space corresponding to the position of the reference object relative to the global coordinate system.

The wording "global structure" should be construed as a structure comprising a plurality of substructures. The test object and the reference object can thus form part of the global structure. According to a non-limiting example, the global structure can be a vehicle and the test object and the reference object can be the vehicle door, or other component/sub structure of the vehicle.

An advantage is that the ultrasonic measurement of the test object can be performed at any desirable position as the coordinates are transformed into another coordinate system. The test object can thus be fixated to a suitable bench or the like at the garage, where after the ultrasonic measurement is performed. Since the coordinates of the test object is transformed into the coordinate system of the global structure, the ultrasonic measuring devices are positioned as similar/same positions for the test object as for the reference object and comparison with the ultrasonic measurement of the reference object is possible.

According to an example embodiment, the ultrasonic reference wave pattern signal may be acquired from a database comprising stored measurement values for a plurality of ultrasonic reference measurements.

Hereby, the mechanic at the garage can easily gain access to ultrasonic reference measurements made on reference objects known to be flawless and free of any defects. Also, in the field of automotive, the database may comprise reference measurements made on a plurality of reference objects for a plurality of various vehicle brands. The database may be a computer stored database which also performs and executes the step of comparing the received ultrasonic wave pattern signal from the test object with the ultrasonic reference wave pattern signal of the reference object for detecting a defect in the test object. Furthermore, the database may comprise various data relating to the reference object and the reference measurement for being able to recreate an ultrasonic measurement of the test object corresponding to the ultrasonic measurement made on the reference object. Such data may relate to e.g. the specific structure for which the reference measurement was made, the specific type of ultrasonic measurement device, specific positions and angles at which the ultrasonic measurement devices was positioned on the reference object. The database may also comprise visual information of the reference object for visually illustrate the position to place the ultrasonic measurement devices on the test object.

The database may be provided in a computer comprising a control unit which includes a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to an example embodiment, the reference object may form part of a global structure, the global structure being connected to a levelling bench arrangement, wherein the reference object comprises a coordinate system relative to the levelling bench arrangement, the method comprising the step of defining the coordinate system of the test object by positioning the test object at a position in a levelling bench arrangement corresponding to the position of the reference object's position in the levelling bench arrangement.

Using a levelling bench will thus position the test object at a substantially similar position in space as the position the reference object had when the reference measurement was made. Hereby, a mechanic can receive information of which position to place the test object, where after the at least one ultrasonic measuring device can be positioned within the test area at the same position as for the reference measurement. The levelling bench may be a so-called "universal levelling bench" which measures the position of the test object to place it at a correct location. The levelling bench may also be a so-called "fixed jig levelling bench" which uses mechanical members to position the test object at a position corresponding to the position of the reference object.

According to an example embodiment, the ultrasonic measuring device may comprise a plurality of transducers arranged at spaced apart positions from each other at the test area, the method comprising the steps of transmitting, by means of the transmitter of the first transducer, an ultrasonic wave pattern signal into the test object along the surface of the test area; and receiving, by means of a respective receiver of the remaining plurality of transducers, the ultrasonic wave pattern signal transmitted by the first transmitter.

An advantage of using a plurality of transducers spaced apart from each other is that an area of interest can be more or less encircled. Hence, the plurality of transducers may form the area to be measured. The area is thus defined by the positions of the plurality of transducers. Hereby, flaws/defects within this area can be detected by means of the ultrasonic measurements. Also, as stated above, by using a first transducer as a sending transducer, and the remaining transducers as receiving transducer, the signal can be distributed along the material wherein defects can be detected between the sending and receiving transducers.

According to an example embodiment, each of the plurality of transducers may be arranged to transmit an ultrasonic wave pattern signal into the test object, and each of the plurality of transducers is arranged to receive an ultrasonic wave pattern signal from the remaining plurality of transducers.

When transmitting the ultrasonic wave pattern signal into the test object, an incident wave is propagating in the material from the sending transducer towards each of the receiving transducers. Hereby, all the receiving transducers, i.e. the transducers not currently transmitting a signal, receive a reflected ultrasonic wave pattern signal with a certain wave length from the transmitting transducers. Similar measurements are thus performed in advance on the reference object. The received amplitude and wave length for each of the transducers are compared to corresponding measurement performed on the reference object. A change in amplitude, phase shift and/or a change in wave length indicate that the test object comprises a defect.

An advantage is that a larger area can be inspected and an improved accuracy of the measurement and evaluation can be made. Since the transmitted signal is received by all of the remaining receivers, the flaw/defect can be detected with higher accuracy and its shape and extension can also be detected.

According to an example embodiment, the test object and the reference object may form part of a respective vehicle, or vehicle component.

Vehicles and vehicle components are often made from form-shaped plate structures which are non-homogenous in shape and often provided with glue joints and/or riveted joints. The present method is thus suitable to use for these relatively complex and often expensive structures. It is also beneficial to use the method for vehicle components as there is a desire to not have to disassemble the structure for inspection thereof.

According to an example embodiment, the at least one ultrasonic measuring device may be measured into the selected position of the test area by means of a measuring device, wherein the measuring devices receives data relating to the coordinate and surface normal angular position of at least one ultrasonic measuring device positioned on the reference area for positioning the ultrasonic measuring device at a position on the test area corresponding to the position of the ultrasonic measuring device on the reference area.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION

Figure 1:
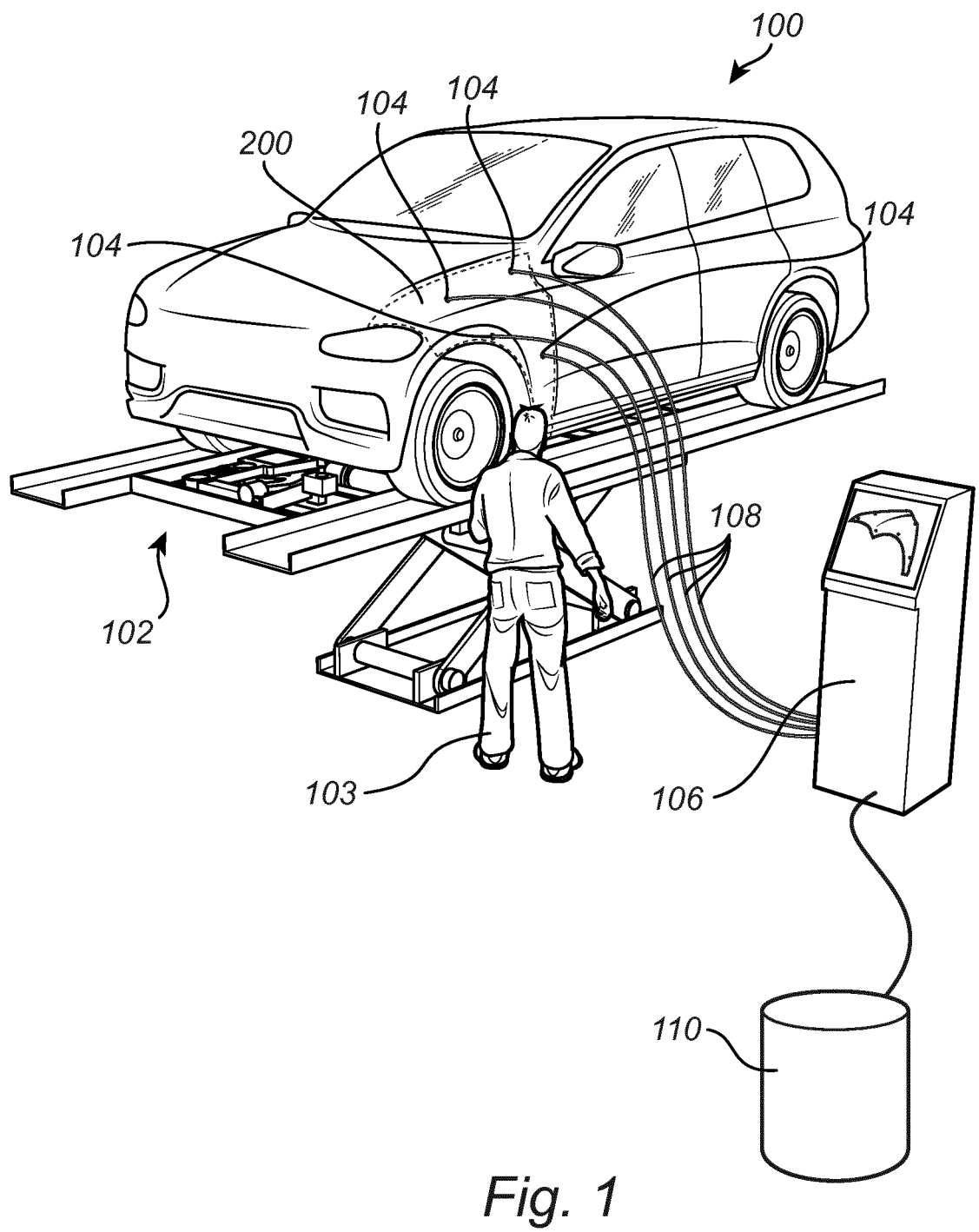
FIG. 1 is a perspective view of vehicle positioned on a levelling bench, wherein ultrasonic inspection of a test object of the vehicle is executed according to an example embodiment of the present invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 100 positioned on a levelling bench arrangement 102. The vehicle 100, which is in the form of a car, has a suspected defect at a side portion thereof, and ultrasonic inspection of a test object 200 of the vehicle 100 is therefore performed. The test object 200, which in the example embodiment depicted in FIG. 1 is a portion of the front plate structure of the vehicle 100, is provided with a plurality of ultrasonic measuring devices 104. The ultrasonic measuring devices 104 are in the following, according to an example embodiment, referred to as transducers 104. The transducers 104 can be positioned on the test object 200 manually to predetermined positions thereon, in the example embodiment depicted in FIG. 1 by a mechanics 103 at a garage. The transducers 104 may also be automatically positioned on the test object 200 by means of an industrial robot, etc. or measured into its correct position by a measuring device which uses a global coordinate system of the vehicle 100 to position the transducers 104 into their respective position. Irrespective of the method used for positioning the transducers 104 to the test object 200, the position for each of the transducers 104 corresponds to the position of the transducers 104 on a reference object 300 (see FIG. 2b), which will be described in further detail below. When, for example, measuring the transducers 104 into its predetermined position by means of the measuring device, the measuring device receives data relating to the coordinate and angular position of the respective transducer 104 on the reference object 300 and thereafter positions the transducer at a position and angle on the test object 200 which corresponds to the position on the reference object 300.

The transducers 104, which will be described further below, are connected to the surface structure of the test object 200, wherein each of the transducers 104 is arranged to transmit a respective ultrasonic wave pattern signal into the material of the test object 200 along the surface of the test object 200, towards each of the remaining transducers 104. Each of the transducers 104 thus receives an ultrasonic wave pattern signal, which signal is transmitted to a computer 106 for analysis thereof. The computer 106 comprises intelligence and means for storage of data. Also, the computer 106 comprises a calculator arranged to perform and execute calculations for determining if a defect is present in the test object 200. The calculator uses, as will be described further below, signal values received from the measurements of the test object 200 and signal values received from corresponding measurements of a reference object 300 (see FIG. 2b).

As depicted in FIG. 1, the transducers 104 are each connected to the computer 106 by means of a respective cable 108. However, the transducers 104 may of course also comprise means for transmitting signals wireless, such as by Wi-Fi, Bluetooth, RFID, or any other suitable means.

Moreover, the computer 106 is connected to a database 110 for acquiring data therefrom. The database 110 is schematically depicted for simplified understanding. The database 110 may also be provided to the computer by other means, such as forming part of acquired data in the computer processor, or by wireless cloud storage, etc. Hence, the database 110 is not necessarily a physical entity but can also be formed by acquired data in the processor of the computer 106. One of the purposes of the database is to contain measured values provided from ultrasonic measurements performed on the reference object 300 (FIG. 2b).

Figure 2A:
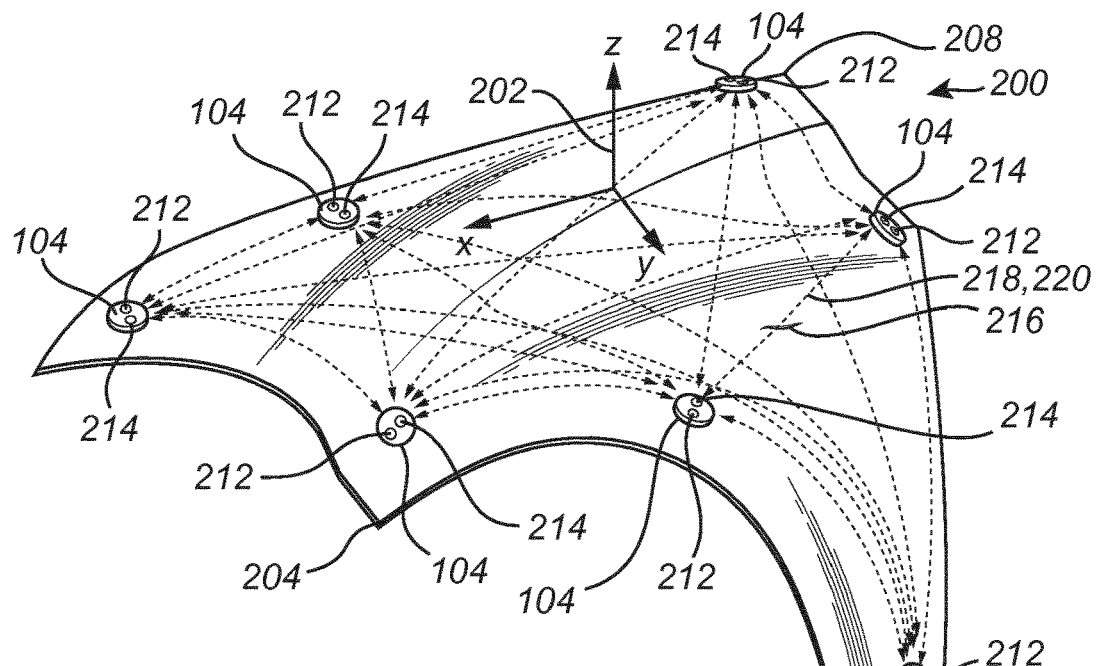
FIG. 2a is a perspective view of a test object according to an example embodiment.
Figure 2B:
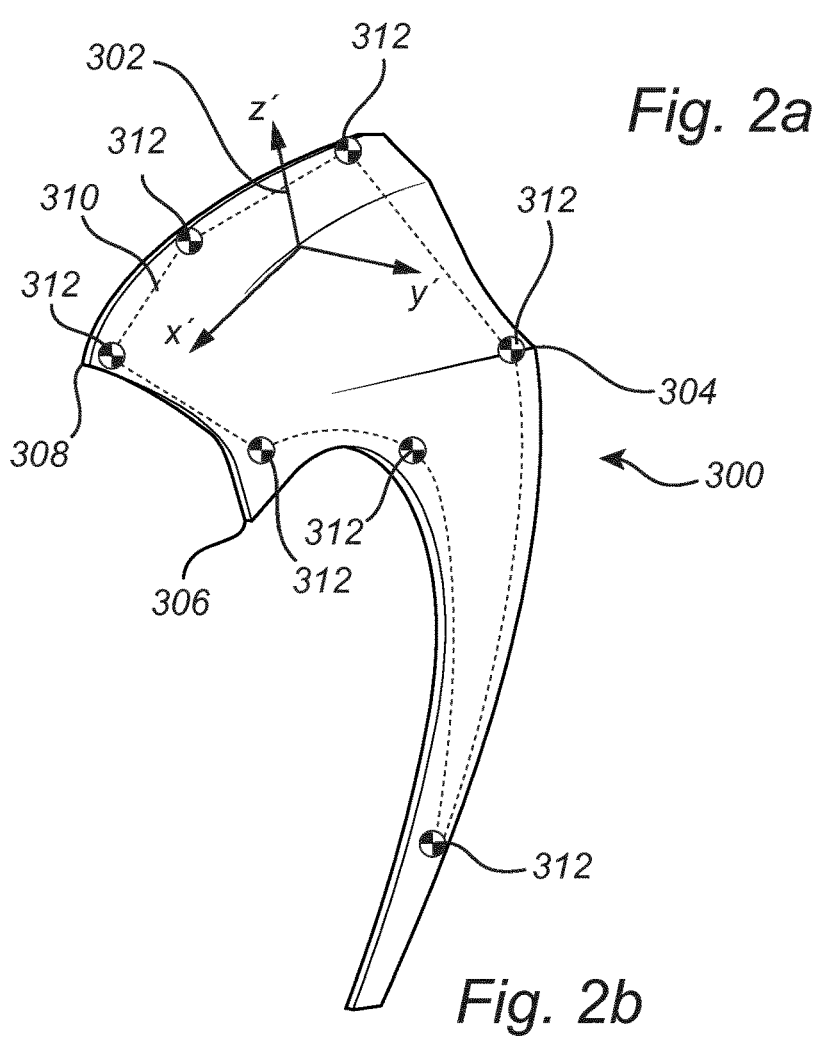
FIG. 2b is a perspective view of a reference object according to an example embodiment.

In order to describe the ultrasonic inspection of the test object 200 in further detail, reference is made to FIGS. 2a and 2b. The test object 200 is depicted in FIG. 2a while the reference object 300 is depicted in FIG. 2b. The ultrasonic inspection is thus made in order to detect a possible defect/flaw in the test object 200, wherein the reference object 300 is known to be free of such defects/flaws. It should thus be readily understood that the test object 200 in FIG. 2a and the reference object 300 in FIG. 2b correspond to the same structure. Hence, the test object 200 and the reference object 300 correspond to each other in shape, structure and material.

Reference is therefore firstly made to FIG. 2a in order to describe the test object 200. As can be seen, the test object 200 comprises a coordinate system 202 arranged to define positions on the surface thereof. The coordinate system 202 is defined by a first 204, a second 206 and a third 208 spatially separated position on the surface of the test object 200. It should however be readily understood that further positions may also be used when defining the coordinate system 202 and the invention should thus not be construed as limited to the use of only three spatially separated positions.

The test object 200 further comprises a test area 210. The test area 210 is thus the area of the test object 200 at which it is to be determined if a defect/flaw is present. According to the embodiment depicted in FIG. 2a, the test area 210 is delimited by a plurality of transducers 104, i.e. the test area 210 is enclosed by the plurality of transducers 104. In the example depicted in FIG. 2a, the test area 210 is delimited by seven transducers 104, although the number is dependent on the desired accuracy as well as the size and configuration of the specific test area 210 of interest.

Furthermore, each of the transducers comprises a transmitter 212 and a receiver 214. The transmitters 212 are arranged to transmit an ultrasonic wave pattern into the test object 200. The receivers 214 are thus arranged to receive an ultrasonic wave pattern. The receivers 214 are further arranged to transmit the received ultrasonic wave pattern signal to the computer 106 described above in relation to FIG. 1. In more detail, each of the plurality of transmitters 212 is arranged to transmit an ultrasonic wave pattern which is received by each of the receivers 214 of the remaining transducers 104. Thus, a first one of the plurality of transducers 104 transmits an ultrasonic wave pattern to the receivers 214 of each of the remaining transducers 104. The ultrasonic wave pattern signal is thus propagating in the material along the surface of the test object 200, whereby the ultrasonic wave pattern signal is received by the receivers 214. Thereafter a second of the plurality of transducers 104 transmits its ultrasonic wave pattern to the receivers 214 of the other transducers 104, and so on. Hereby, a receiver 214 of a transducer 104 receives an ultrasonic wave pattern signal from each of the remaining transducers 104 in the test area 210. The distribution of the ultrasonic wave patterns in FIG. 2a is illustrated by straight dotted lines between the transducers. This illustration is merely made for simplicity of understanding. Also, signals are depicted by two-way arrows for not making FIG. 2a to complex.

Moreover, as depicted in FIG. 2a, a defect 216 is present in the test object 200. The defect 216 may be a flaw or a scratch etc. However, although not depicted, the defect 216 may also be a defect in a glue joint connecting e.g. two solid pieces together. The defect in such glue joint may be caused by the glue loosing its attachment to one of the solid pieces. As can be seen in FIG. 2a, the defect 216 is present in such a position within the test area 210 that at least one of the transmitted ultrasonic wave patterns 218, 220 is propagating through the defect 216. Hereby, the received ultrasonic wave pattern signals 218, 220 will be phase shifted and have different amplitude in relation to corresponding ultrasonic wave pattern signals received for a defect-free material. Also, the received ultrasonic wave pattern signals 218, 220 may possibly be frequency shifted in relation to the corresponding ultrasonic wave pattern signals received for a defect-free material. This will be further described below in relation to the description of FIG. 3.

Turning now to FIG. 2b, a perspective view of a reference object 300 according to an example embodiment is depicted. The ultrasonic measurement made on the reference object 300 is made in advance relative to the ultrasonic measurement made on the test object 200. The reference object 300 comprises a coordinate system 302 arranged to define positions on the surface thereof. The coordinate system 302 of the reference object 300 is preferably defined by a first 304, a second 306 and a third 308 spatially separated position on the surface of the reference object 300. Similar to the above discussion of the coordinate system 202 of the test object 200, further positions may also be used on the reference object 300 when defining the coordinate system 302 thereof.

Moreover, the reference object 300 comprises a reference area 310. The reference area 310 of the reference object 300 is delimited by a plurality of transducers 312. The transducers 312 arranged on the reference object 300 are similar in structure and functionality as the above described transducers 104 arranged on the test object 200. Accordingly, each of the transducers 312 comprises a transmitter and a receiver, wherein each transmitter is arranged to transmit an ultrasonic wave pattern into the material of the reference object, which signal is received by the receivers of the remaining transducers 312. In order to simplify the depicted reference object 300, the ultrasonic wave pattern distribution is omitted from FIG. 2b.

According to the example embodiment depicted in FIGS. 2a and 2b, the test object 200 and the reference object 300 are not arranged in a similar position in space. The direction of the coordinate axis of the coordinate system 202 for the test object 200 does not correspond to the direction of the coordinate axis of the coordinate system 302 of the reference object 300. However, the test area 210 of the test object 200 and the reference area 310 of the reference object 300 correspond to each other in shape, structure and material. Hence, the reference object 300 is also in the form of a portion of the front plate structure of a similar vehicle 100 as depicted in FIG. 1.

When performing an ultrasonic measurement on the reference area 310, the reference area 310 is known to be free from defects/flaws. As described above, the transmitters of each of the transducers 312 transmits an ultrasonic wave pattern into the reference object, which transmitted ultrasonic wave pattern propagates in the material to the receivers of each of the remaining transducers 312 defining the reference area 310. Hereby, a plurality of ultrasonic reference wave pattern signals is provided. These signals represent the wave propagation of a defect free/flawless structure.

Figure 3:
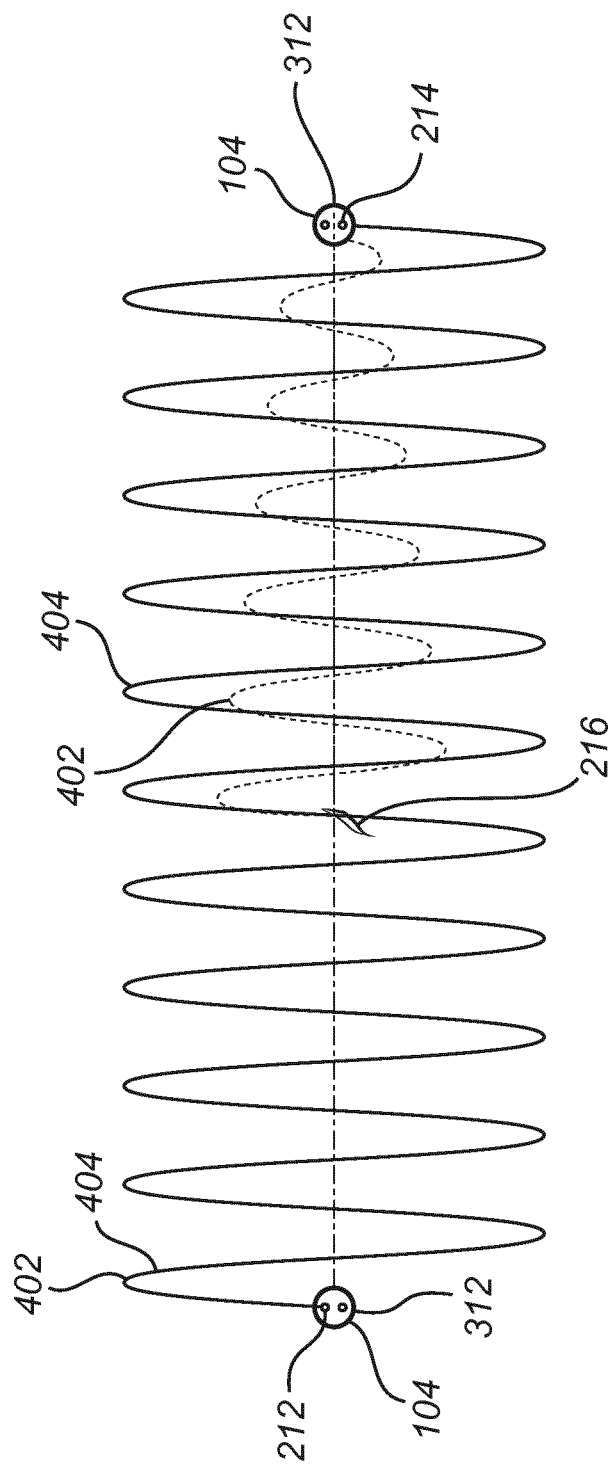
FIG. 3 schematically illustrates an example embodiment of a wave propagation in the test object and the reference object.

Reference is made to FIG. 3, which is a schematic illustration of the wave propagation in the test object 200 and the reference object 300 according to an example embodiment. As can be seen, an ultrasonic wave pattern 402 is transmitted from one of the transmitters 212 into the test area 210 along the surface of the test object 200. As also illustrated, an ultrasonic reference wave pattern 404 is transmitted from the transmitter of a transducer 312 positioned at a corresponding position on the reference object 300. The ultrasonic wave pattern transmitted into the test object 200 and the ultrasonic reference wave pattern transmitted into the reference object 300 is thus depicted in the same schematic illustration of FIG. 3. As can be seen, the wavelength of the ultrasonic wave pattern 402 in the test object 200 and the ultrasonic reference wave pattern 404 in the reference object 300 is similar until the ultrasonic wave pattern 402 of the test object 200 arrives at the defect/flaw 216.

When the ultrasonic wave pattern 402 in the test object 200 arrives at the defect/flaw 216, it is phase shifted in comparison to the ultrasonic reference wave pattern 404 in the reference object 300. Also, the amplitude of the wave pattern 402 is reduced when arriving at the detected defect/flaw. Although not illustrated in FIG. 3, the frequency/wavelength of the wave pattern 402 may be affected when arriving at the defect/flaw. The ultrasonic wave pattern in the test object 402 is depicted with dashed lines while the ultrasonic reference wave pattern 404 in the reference object 300 is depicted with solid lines. Accordingly, the ultrasonic wave pattern 402 in the test object 200 will, as a result of the defect/flaw 216, arrive at the receiver 214 of the other transducer 104 at a later point in time in comparison to the ultrasonic reference wave pattern 404 in the reference object 300.

FIG. 3 illustrates that the amplitude of ultrasonic wave patterns 402, 404 are at the same level from the transmitter 212 to the detected defect/flaw 216. Thereafter, the amplitude is reduced for the ultrasonic wave pattern 402 in the test object 200. This should however be construed as a schematic illustration and can vary depending on e.g. the structure and size of the defect, etc. Furthermore, also the frequency/wavelength can vary, i.e. be increased/reduced after arriving at the defect/flaw.

Figure 4:
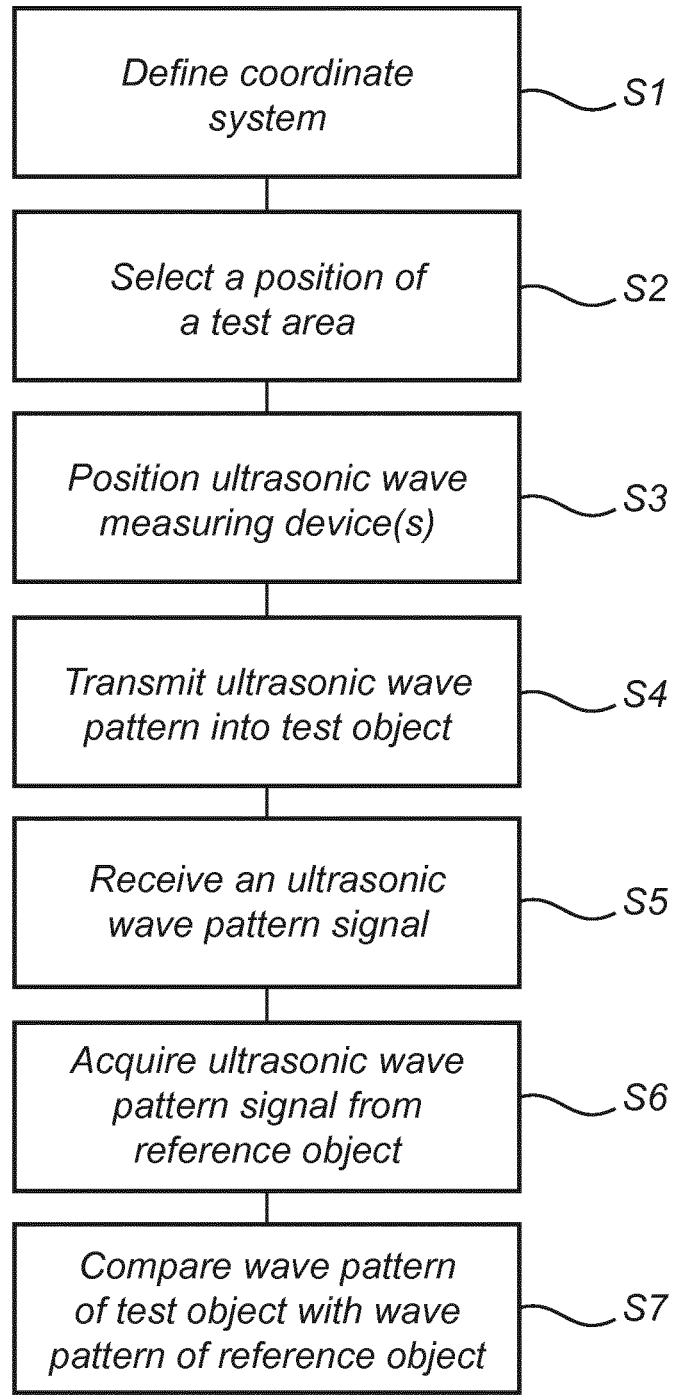
FIG. 4 is a flow chart of a method for ultrasonic inspection of the test object according to an example embodiment.

The following will now describe an example embodiment of how to perform ultrasonic inspection of the test object 200 in order to determine/detect if a defect/flaw is present therein. Reference is therefore made to FIG. 4 in combination with the illustrations in FIGS. 1-3.

Firstly, the coordinate system 202 of the test object 200 is defined S1 according to the above description in relation to FIG. 2a. The coordinate system 202 may be defined by at least three spatially separated positions in relation to the vehicle 100 in FIG. 1. Hence, the test object 200 does not have to be disconnected from the vehicle 100. The test area 210 is thus determined and at least one position of the test area is selected S2. The selected position is in FIG. 2a defined by seven positions on the test object 200 at which the transducers 104 are to be positioned. The selected positions are preferably acquired predetermined positions which correspond to the positions and angular placement of the transducers 312 of the reference object 300. Hence, the ultrasonic measurement of the reference object 300 is, as described above, performed in advance and stored in the database.

The transducers 104 are then positioned S3 within the test area 210 at the previously selected positions and an ultrasonic wave pattern signal 402 is transmitted S4 from the transmitter 212 of each transducer 104 into the test object 200. The transmitted ultrasonic wave pattern signal 402 is received S5 by the respective receivers 214. The received ultrasonic wave pattern signals 402 of the test object 200 thus have specific wavelengths and amplitudes.

Furthermore, a corresponding ultrasonic measurement has been made in advance on the reference area 310 of the reference object 300. Accordingly, the ultrasonic reference wave pattern 404 for the reference object 300 depicted in FIG. 3 has been made in advance so that received ultrasonic reference wave pattern signals 404 are available in e.g. a database 110. The ultrasonic reference wave pattern 404 of the reference object thus has a specific wavelength and amplitude, i.e. reference wavelength/reference amplitude.

As the measurements on the reference object 300 has been made in advance, the ultrasonic reference wave pattern signal 404 is acquired S6 for the reference area 310 of the reference object 300. Since the transducers were positioned on the test object 200 at positions corresponding to the positions of the transducers on the reference object 300, the respective ultrasonic wave pattern signals 402, 404 can be compared S7 to each other. Accordingly, the wave pattern, i.e. one of the wavelength, phase shift and amplitude, of the received ultrasonic wave pattern 402 for the test area 210 is compared to a corresponding one of the wavelength, phase shift and amplitude of the received ultrasonic reference wave pattern 404 for the reference area 310. If there is a difference in wavelengths, phase shift and/or amplitude, a defect/flaw in the test object is detected.

It is to be understood that the present invention is not limited to the embodiment described above and illustrated in the drawings; rather, the skilled person will recognize that many changes and modifications may be made within the scope of the appended claims.

The invention claimed is:

1. A method for ultrasonic inspection of a test object, comprising the steps of:
    defining a coordinate system of the test object based on at least a first, a second and a third spatially separated position at a surface of the test object;
    selecting, relative to the coordinate system of the test object, at least two spaced apart positions of a test area of the test object, the test area being an area of the test object which is to be inspected;
    positioning a first and a second transducer of an ultrasonic measuring device at a respective one of the at least two positions within the test area, wherein each of the transducers comprises a transmitter for transmitting an ultrasonic wave pattern signal and a receiver for receiving an ultrasonic wave pattern signal;
    transmitting, by means of the transmitter of the first transducer, an ultrasonic wave pattern into the test object, along the surface of the test area;
    receiving, by means of the receiver of the second transducer, the ultrasonic wave pattern signal transmitted by the transmitter of the first transducer;
    acquiring, from a database that stores measurement values for a plurality of ultrasonic reference measurements of a reference object different from the test object, an ultrasonic reference wave pattern signal for a reference area of the reference object, the reference area being provided with a first and a second transducer of an ultrasonic measuring device having a respective position within a coordinate system of the reference object corresponding to the at least two positions of the test area within the coordinate system of the test object such that the respective positions for the reference object are the same positions as the at least two positions for the test object; and
    comparing the received ultrasonic wave pattern signal from the test object with the acquired ultrasonic reference wave pattern signal of the reference object for detecting a defect in the test object.

2. The method according to claim 1, wherein the test area of the test object and the reference area of the reference object correspond to each other in shape and structure.

3. The method according to claim 1, wherein the selected position of the test area is a predetermined position.

4. The method according to claim 3, wherein the predetermined position comprises a predetermined angular position of the at least one ultrasonic measuring device relative to a normal of a surface of said position within the test area, said predetermined angular position corresponding to an angular position of the ultrasonic measuring device of the reference area.

5. The method according to claim 1, wherein the ultrasonic reference wave pattern signal is provided from an ultrasonic reference measurement on a position of the reference area, wherein the step of selecting a position of the test area comprises the step of:
    selecting, relative to the coordinate system of the test object, a position of the test area corresponding to the position of the ultrasonic reference measurement.

6. The method according to claim 1, wherein the reference object forms part of a global structure having a global coordinate system, the method comprising the steps of:
    acquiring coordinates for at least a first, a second and a third spatially separated position at a surface of the reference object relative to the global coordinate system; and
    transforming the test object into the coordinate system of the reference object for positioning the test object at a position in space corresponding to the position of the reference object relative to the global coordinate system.

7. The method according to claim 1, wherein the reference object forms part of a global structure, the global structure being connected to a levelling bench arrangement, wherein the reference object comprises a coordinate system relative to the levelling bench arrangement, the method comprising the step of:
    defining the coordinate system of the test object by positioning the test object at a position in a levelling bench arrangement corresponding to the position of the reference object's position in the levelling bench arrangement.

8. The method according to claim 1, wherein the ultrasonic measuring device comprises a plurality of transducers arranged as spaced apart positions from each other at the test area, the method comprising the steps of:
    transmitting, by means of the transmitter of the first transducer, an ultrasonic wave pattern signal into the test object along the surface of the test area; and
    receiving, by means of a respective receiver of the remaining plurality of transducers, the ultrasonic wave pattern signal transmitted by the first transmitter.

9. The method according to claim 8, wherein each of the plurality of transducers is arranged to transmit an ultrasonic wave pattern signal into the test object, and each of the plurality of transducers is arranged to receive an ultrasonic wave pattern signal from the remaining plurality of transducers.

10. The method according to claim 1, wherein the test object and the reference object forms part of a respective vehicle, or vehicle component.

11. The method according to claim 1, wherein the at least one ultrasonic measuring device is measured into the selected position of the test area by means of a measuring device, wherein the measuring devices receives data relating to the coordinate and surface normal angular position of at least one ultrasonic measuring device positioned on the reference area for positioning the ultrasonic measuring device at a position on the test area corresponding to the position of the ultrasonic measuring device on the reference area.

\* \* \* \* \*